United States Patent

Jiu et al.

[11] 3,892,848
[45] July 1, 1975

[54] MICROBIOLOGICAL PRODUCTION OF BIOLOGICALLY ACTIVE 8,8'-BI-1H-NAPHTHO[2,3-C]PYRANS AND PRODUCTS

[75] Inventors: James Jiu; Seth S. Mizuba, both of Morton Grove, Ill.

[73] Assignee: G. D. Searle & Co., Chicago, Ill.

[22] Filed: Jan. 31, 1974

[21] Appl. No.: 438,258

[52] U.S. Cl. ............ 424/115; 195/81; 260/343.2 R; 424/279
[51] Int. Cl. ...... A61k 21/00; C07c 7/46; C12d 9/00
[58] Field of Search ................ 260/343.2 R; 195/81; 424/115, 279

[56] References Cited
OTHER PUBLICATIONS
Forss et al., Chem. Abstracts, Vol. 76(1972), p. 367.

Primary Examiner—James A. Patten
Attorney, Agent, or Firm—John J. McDonnell

[57] ABSTRACT

The present invention is concerned with the microbial production of anti-microbial product and anti-microbial agents of the formula

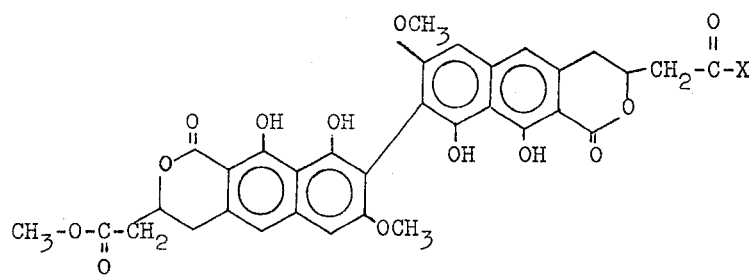

wherein X represents —$CH_3$ or —O—$CH_3$. These agents are extracted from the growth of *Spicaria divaricatum* NRRL 5771. The compound wherein X is —$CH_3$ is particularly active in inhibiting the growth of fungi, bacteria, viruses, and in addition is an effective anti-desoxycorticosterone acetate (DCA) agent.

4 Claims, No Drawings

MICROBIOLOGICAL PRODUCTION OF BIOLOGICALLY ACTIVE 8,8'-BI-1H-NAPHTHO[2,3-C]PYRANS AND PRODUCTS

The present invention is concerned with the production of anti-microbial product and anti-microbial agents of the formula

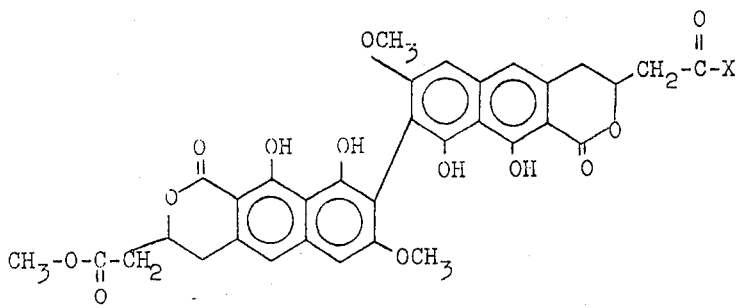

wherein X is methyl or methoxy.

The anti-microbial product is extracted by organic solvent to form organic solvent extracts from aqueous nutrient medium containing *Spicaria divaricata* NRRL 5771*. The organic solvent extracts are separated from the aqueous nutrient medium containing *Spicaria divaricata* NRRL 5771 and then the organic solvent is evaporated to provide an active anti-microbial product. The anti-microbial agents set-out in the above formula are isolated from the anti-microbial product by column chromatography on silicic acid.

*NRRL cultures can be obtained at ARS Culture Collection, 1815 North University Street, Peoria, Illinois 61604

The compound 3,3' di-(methylcarboxymethyl) 3,3',-4,4'-tetrahydro-9,9',10,10'-tetrahydroxy-7,7'-dimethoxy-1,1'-dioxo-8,8'-Bi-1H-naphtho[2,3-c]pyran (X=—OCH$_3$) was described by Weisleder and Lillehoj, Tetrahedron Letters No. 48, 4705 (1971) as a mouse toxin isolated from mycelia of *Aspergillus viridi-nutans* (NRRL 4365). The compound, 3-(2-oxopropyl) 3'-methylcarboxymethyl-3,3',4,4'-tetrahydro-9,9',10, 10'-tetrahydroxy-7,7'-dimethoxy-1,1'-dioxo-8,8'-Bi-1H-naphtho[2,3-c]pyran (X=CH$_3$), is structurally distinct from the prior art compound of Weisleder and Lillehoj in that the former has a methyl ketone moiety as opposed to an ester group in one of the 3 positions.

A nutrient medium is required for culture of the organism, which is to say one containing assimiable nitrogen and carbon; and an adequate supply of sterile air should be maintained therein, for example, by exposing a large surface of the medium to the air or preferably passing it through the medium in quantities sufficient to support submerged growth.

Suitable nitrogen sources are thus normally employed for the purpose, including soy bean meal, corn steep liquor, meat extract, protein (optionally digested), peptone, yeast extract, distillers' solubles, casein hydrolysate, nitrate, cottonseed meal and/or ammonium compounds. All of the foregoing materials excepting sometimes the last two serve also as carbon sources. Other carbon-containing substances satisfactory and conventionally used as nutrients are the carbohydrates, for example, glycerol, glucose, fructose, sucrose, lactose, maltose, inositol, dextrin, starch and whey.

Phosphate, magnesium, and/or ferrous ions likewise may be incorporated in the culture medium as growth-promoting factors if desired; buffers may be added to assure that growth is initiated at a suitable pH. In the present invention sitosterol or sitostenone is used as inducing agent to increase yields of the desired products.

In a preferred embodiment, a medium containing 10 parts cottonseed meal, 50 parts glucose, 30 parts corn steep liquor, 0.3 part concentrated hydrochloric acid, and 1000 parts tap water having a pH of 3.9±2 is sterilized for 15 minutes at 121°. To this medium is added 0.010 to 0.025 part of sitosterol or sitostenone and then the medium is innoculated with *Spicaria divaricata* NRRL 5771 and incubated for 6 days. The aqueous nutrient medium containing *Spicaria divaricata* NRRL 5771 is extracted with 2000 parts of methylene chloride, as organic solvent, and the methylene chloride is removed from the extracts by evaporation.

Those skilled in the art will recognize interchangeability of a wide variety of media and conditions with the conditions set out in the preferred embodiment. Extractions with organic solvents other than methylene chloride such as benzene, toluene, hydrocarbons containing 5–8 carbon atoms and chloroform are suitable but not exclusive organic solvents useful for extraction.

The crude extract is surprisingly active anti-microbial product and inhibits the growth of *Candida albicans*. It is more active than either 3,3' di-(methylcarboxymethyl) 3,3',4,4'-tetrahydro-9,9',10,10'-tetrahydroxy-7,7'-dimethoxy-1,1'-dioxo-8,8'-Bi-1H-naphtho[2,3-c]pyran or 3-(2-oxopropyl) 3'-methylcarboxymethyl-3,3',4,4'-tetrahydro-9,9',10,10'-tetrahydroxy-7,7'-dimethoxy-1,1'-dioxo-8,8'-Bi-1H-naphtho[2,3-c]pyran. This activity is determined on 8.5 cm. plates containing 10 mg. of Sabouraud dextrose agar and coated with $10^7$ cells per 0.1 ml. solution of a 24 hour growth of *Candida albicans*. Nystatin standard containing 75 units is absorbed on 6.35 mm. disc of filter paper and dried. Test compound is likewise absorbed on a 6.35 mm. disc of filter paper and dried. Test and standard discs are placed on the agar plate and incubated for 24 hours. Test compounds having zones of inhibition of 13–15 mm. diameter comparable to nystatin standard are considered active. This is an effective method of following chromatography of active constituents.

The crude dry extracts from methylene chloride extractions are taken up to the extent soluble in benzene and the benzene solution is placed on a silica gel column. A combination of elution with progressively more polar solvents and fractional crystallization provides 3,3' di-(methylcarboxymethyl) 3,3',4,4'-tetrahydro- 9,9',10,10'-tetrahydroxy-7,7'-dimethoxy-1,1'-dioxo-8,8'-Bi-1H-naphtho[2,3-c]pyran and 3-(2-oxopropyl) 3'-methylcarboxymethyl -3,3',4,4'-tetrahydro-9,9',10,10'-tetrahydroxy -7,7'-dimethoxy-1,1'-dioxo-8,8'-Bi-1H-naphtho[2,3-c]pyran.

The diuretic utility of the instant compounds is evident from the results of standardized tests for their capacity to reverse the renal electrolyte effects of desoxycorticosterone acetate (DCA) in rats. Such a test, substantially as described in C. M. Kagawa in chapter 34 of volume II of "Evaluation of Drug Activities: Pharmacometrics", by D. R. Laurence and A. L. Bacharach, can be carried out as follows. A group (Group I) of 8 male Charles River rats, each weighing between 150 and 200 gm., is adrenalectomized and maintained thereafter on sugar cubes and tap water ad libitum overnight. Each animal is thereupon subjected to these successive treatments: (a) 0.02 mg. of DCA dissolved in 0.1 ml. of corn oil is injected subcutaneously; (b) 2.4 mg. of test compound dissolved in 0.5 ml. of corn oil or other physiologically inert solvent, e.g. physiological saline, is administered orally; (c) 2.5 ml. of aqueous approximately 0.9% sodium chloride is injected subcutaneously. Urinary sodium and potassium are measured by customary techniques on samples of urine collected during the 4 hours immediately following treatment. Controls are provided by second and third groups of 8 each 150–200 gm. rats concurrently and identically treated excepting that in Group II, 0.33 mg. of spironolactone is substituted for the test compound and the solution thereof is injected subcutaneously, while in Group III neither test compound nor spironolactone is administered. DCA produces sodium (Na) retention, loss of potassium (K), and a corresponding reduction in the mean log Na×10/K. Spironolactone serves as an index of the validity of the test, the dose of 0.33 mg. having been shown to induce a 50% reversal of the effects of the DCA. Kagawa, in *Endocrinology*, 74, 724 (1964), reported a standard error of ±0.084 per 4-rat response, determined from a large number of tests and based on 60° of freedom, for the mean log Na×10/K measurement. From this it can be calculated that the least significant difference ($P<0.05$) in mean log Na×10/K between 2 groups of 8 rats each is ±0.168. It follows that when mean log Na×10/K for Group I is equal to or greater than that for Group II, and in addition exceeds the value for Group III by at least 0.168 log units, the reversals of the renal electrolyte effects of DCA represented thereby are significant.

Anti-viral activity of the instant compound is evidenced by the following test:

Cell cultures of primary Rhesus monkey kidney maintained in 25 cc. plastic flasks and each containing test compound at concentrations of 625, 125, 25, 5, or 1 microgram per milliliter are prepared in pairs. These flasks, and an identical pair of flasks containing no test compound, are each innoculated with a dose of influenza virus type A (strain 575) previously shown to produce maximum hemadsorption and minimum cytopathogenic effects after a 24 hour incubation. Where the cultures contain test compound, the virus is added 1 hour after addition of the compound to the culture. After 24 hours incubation of the cultures, the supernatant fluids are removed and 3.0 ml. of a 0.4% suspension of guinea pig erythrocytes are added to each flask. The flasks are then incubated at 4° C. in a horizontal position for 30 minutes. The flasks are rocked every 10 minutes during the incubation period. After this incubation, the red cell suspension is decanted from each flask, the flasks are washed twice with 3.0 ml. of phosphate buffer solution (pH 7.4) to remove unadsorbed red cells, and 3.0 ml. of distilled water is then added to lyse the adsorbed cells. The flasks are then further incubated at 37° C. for 30 minutes in a horizontal position and the flasks are rocked every 10 minutes. After this incubation, the fluid contents of the pairs of flasks are combined to form an assay unit and are placed at room temperature for 15–30 minutes to allow settling of cellular debris. A pair of control flasks identical with the above, except for the absence of test compound and virus inoculation, is run concurrently. The resulting hemoglobin solutions from each assay unit are then read for optical density in a Beckman spectrophotometer at about 415 millimicrons. A test compound is considered active if, at one of the tested levels, it reduces the optical density reading by at least 50% relative to the virus control.

The anti-bacterial utility of the instant compounds is evident from the results of standardized tests for their capacity to inhibit growth of *Clostridium perfringens* ATCC 13124. In these tests, fluid thioglycollate medium (manufactured by Baltimore Biological Laboratories or Difco) is prepared as recommended by the manufacturer, sterilized, and inoculated with one million cells per ml., determined spectrophotometrically 450 M$\mu$ of a culture of *Clostridium perfringens* ATCC 13124. Meanwhile, compound is heated in sterile distilled water at a concentration of 1000 $\gamma$/ml. and a temperature of 80° C. for 20 minutes. One-half ml. mixture of this compound preparation and 4.5 ml. of the inoculated broth is mixed to provide a solution containing a relative concentration of 100 $\gamma$/ml. of test compound. Then 0.5 ml. of this mixture is finally serially diluted and mixed with sufficient quantity of the inoculated broth as mentioned above to produce concentrations of approximately 10, 1, and 0.1 $\gamma$/ml. of test compound. The resultant mixtures are incubated anaerobically for 20–24 hours at 37° C. Controls are provided by concurrent incubations identical with the foregoing excepting that no compound is present. Reference standards containing 4.3, 0.43, 0.043, and 0.0043 $\gamma$/ml. of streptomycin sulfate and 6667, 667, 67, and 7 units of potassium penicillin G are prepared as set out above. Degree of activity is determined by gross examination and compounds which do not inhibit growth at 100 mcgm./ml. are considered inactive.

EXAMPLE 1

Methylene chloride extraction of a fermentation of *Spicaria divaricata* NRRL 5771 in a medium containing 10 parts cottonseed meal, 50 parts glucose, 30 parts corn steep liquor, 0.3 parts hydrochloric acid, and 1000 parts tap water, 0.01–0.025 part sitosterol; sterilized at 121° C. for 15 minutes; and having a pH of 3.9±0.2 provided 1357 parts of crude extract after removal of the methylene chloride in vacuo.

The crude material is extracted three times with 27 l. of benzene. The benzene soluble material is chromatographed on 27 kilograms silicic acid. The columns are further eluted with solvent systems comprising benzene, benzene-ethyl acetate, ethyl acetate, methanol-ethyl acetate, and methanol, in various proportions.

The fractionation processes are monitored by in vitro agar diffusion anti-*Candida albicans* assay and TLC. Thin layer plates, 20×20 cm., were prepared from silica gel G (E. M. Laboratories, Inc., Elmsforth, N.Y. 10523). Solvent systems used: chloroform-ethanol-formic acid::90:4:6 and benzene-ethanol-formic acid::90:4:6. Detection: Sprayed with 50% sulfuric acid and phosphomolybdic acid, heat.

Material eluted with 50% ethyl acetate-benzene (v/v) and 100% ethyl acetate contained some of the above constituents. These fractions were combined, concentrated in vacuo to give 574 g. of material.

About 213 g. of the above material was dissolved in 36 liters of 25% ethyl acetate-benzene. The solution was loaded and eluted onto a column containing 10 kilograms silicic acid. The column was further eluted with 25% ethyl acetate-benzene, more polar combinations of ethyl acetate-benzene, ethyl acetate; combinations of methanol ethyl acetate, and methanol, successively, with increasing polarity. The column was monitored as described above.

Material eluted with 25%, 30% and 35% ethyl acetate-benzene contained the active constituents of interest. These fractions were pooled, concentrated in vacuo to give 188 g. of material containing active components.

About 50 g. of this latter material was dissolved in 15 liters of benzene. The resulting solution was chromatographed on 10 kilograms of silicic acid in a manner similar as described above.

Fractions eluted with principally 10 and 15% ethyl acetate benzene contained 3,3′ di-(methylcarboxymethyl)-3,3′,4,4′-tetrahydro-9,9′,10,10′-tetrahydroxy-7,7′-dimethoxy-1,1′-dioxo-8,8′-Bi-1H-naphtho[2,3-c]pyran.

Final purification of 3,3′ di-(methylcarboxymethyl)-3,3′,4,4′-tetrahydro-9,9′,10,10′-tetrahydroxy-7,7′-dimethoxy-1,1′-dioxo-8,8′-Bi-1H-naphtho[2,3-c]pyran was achieved by elution from silicic acid column with 50% chloroform-benzene and then recrystallization from ethyl acetate; 12.2g., m.p. 262–267 (dec.) $C_{34}H_{30}O_{13}$, mw 646.

|  | C | H | O |
|---|---|---|---|
| Calcd. | 61.63 | 4.56 | 33.87 |
| Found | 61.51 | 4.57 | 33.88 |

UV ($CH_3CN$) $\lambda_{max}$ $226_{nm}$ $\epsilon = 31,300$; $264_{nm}$ $\epsilon = 75,500$; and $376_{nm}$, $\epsilon = 16,600$; IR ($CHCl_3$) 1745, 1660 shoulder, 1640, 1585 $cm^{-1}$.

Fractions eluted with 25% ethyl acetate-benzene contain 3-(2-oxopropyl) 3′-methylcarboxymethyl-3,3′,4,4′-tetrahydro-9,9′,10,10′-tetrahydroxy-7,7′-dimethoxy-1,1′-dioxo-8,8′-Bi-1H-naphtho[2,3-c]pyran and purification is achieved by elution on a silicic acid column with 35% chloroform in benzene and then recrystallization from ethanol. This compound is characterized as follows: mw = 662, m.p. 238 $C_{34}H_{30}O_{14}$

|  | C | H | O |
|---|---|---|---|
| Calcd. | 63.15 | 4.68 | 32.17 |
| Found | 62.65 | 4.69 | 31.89 |

UV ($CH_3CN$) $\lambda_{max}$ $227_{nm}$ $\epsilon=31,800$; $264_{nm}$ $\epsilon=66,000$; and $374_{nm}$ $\epsilon=18,300$; IR ($CHCl_3$) 1743, 1660 shoulder, 1640, 1587 $cm^{-1}$.

What is claimed is:

1. A process for producing an anti-microbial product comprising growing *Spicaria divaricata* NRRL 5771 in an aqueous nutrient medium, extracting said aqueous nutrient medium containing *Spicaria divaricata* NRRL 5771 with organic solvent to provide organic solvent extracts, separating said organic solvent extracts from said aqueous nutrient medium containing *Spicaria divaricata* NRRL 5771, and evaporating the organic solvent.

2. The anti-microbial product produced by the process of claim 1.

3. The process of claim 1, wherein the anti-microbial product of claim 1 is subjected to column chromatography to provide compounds of the formula

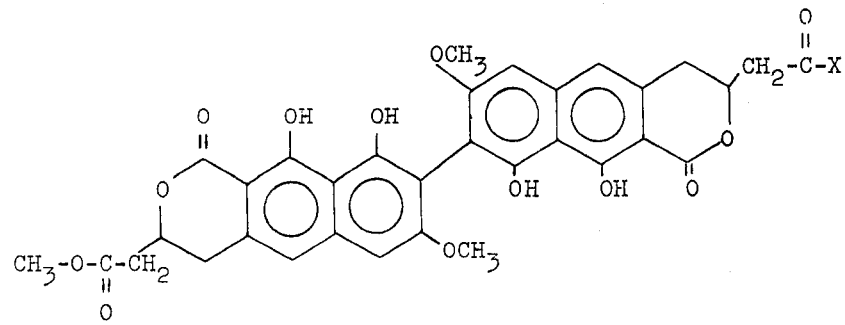

in which X represents methyl or methoxy.

4. The compound produced by the process of claim 3, which compound is 3-(2-oxopropyl) 3′-methylcarboxymethyl-3,3′,4,4′-tetrahydro-9,9′,10,10′-tetrahydroxy-7,7′-dimethoxy-1,1′-dioxo-8,8′-Bi-1H-naphtho[2,3-c]pyran.

* * * * *